(12) United States Patent
Odagaki et al.

(10) Patent No.: US 11,716,530 B2
(45) Date of Patent: Aug. 1, 2023

(54) DISPLAY APPARATUS AND IMAGE PICKUP APPARATUS

(71) Applicant: CANON KABUSHIKI KAISHA, Tokyo (JP)

(72) Inventors: Koichi Odagaki, Kanagawa (JP); Yoichi Osada, Kanagawa (JP); Takashi Miyazaki, Tokyo (JP); Jiro Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 17/376,261

(22) Filed: Jul. 15, 2021

(65) Prior Publication Data

US 2022/0030169 A1 Jan. 27, 2022

(30) Foreign Application Priority Data

Jul. 27, 2020 (JP) .................................. 2020-126653
Aug. 28, 2020 (JP) .................................. 2020-144157
May 18, 2021 (JP) .................................. 2021-083792

(51) Int. Cl.
*H04N 23/63* (2023.01)
*G06F 3/01* (2006.01)
*H04N 23/53* (2023.01)
*H04N 23/55* (2023.01)

(52) U.S. Cl.
CPC ............ *H04N 23/63* (2023.01); *G06F 3/013* (2013.01); *H04N 23/53* (2023.01); *H04N 23/55* (2023.01)

(58) Field of Classification Search
CPC ............ H04N 5/22525; H04N 5/2254; H04N 5/23293; H04N 5/232939; H04N 5/2351; H04N 5/238; G06F 3/013; G03B 13/06; G03B 11/00; G02F 1/163
See application file for complete search history.

(56) References Cited

U.S. PATENT DOCUMENTS

2009/0303339 A1* 12/2009 Kudo .................. H04N 5/23245
 348/222.1
2020/0228693 A1* 7/2020 Ishida ................ H04N 5/22525

FOREIGN PATENT DOCUMENTS

JP 2015-141296 A 8/2015

* cited by examiner

*Primary Examiner* — Xi Wang
(74) *Attorney, Agent, or Firm* — Cowan, Liebowitz & Latman, P.C.

(57) ABSTRACT

A display apparatus includes an image display element, an eyepiece portion, an object window, and a reflection optical element disposed at a position between the eyepiece portion and the object window, the reflection optical element being configured to guide a picture displayed on the image display element to the eyepiece portion. The reflection optical element changes a state to a first state and a second state by changing a transmittance. In the first state, the picture displayed on the image display element is viewed via the eyepiece portion. In the second state, an image in which an image from the object window and an image displayed on the image display element are superimposed is viewed via the eyepiece portion.

26 Claims, 9 Drawing Sheets

DISPLAY APPARATUS AND IMAGE PICKUP APPARATUS

BACKGROUND OF THE INVENTION

Field of the Invention

The present disclosure relates to a display apparatus and an image pickup apparatus.

Description of the Related Art

Conventionally, optical sights called dot sights have been widely used for capturing images of distant moving objects such as birds or airplanes, using image pickup apparatuses. In image pickup apparatuses having high-magnification lenses, display apparatuses such as electronic view finders have been widely used for stably capturing images. Japanese Patent Application Laid-Open No. ("JP") 2015-1412% discloses an image pickup apparatus including both an electronic view finder and an optical sight.

However, in the image pickup apparatus disclosed in JP 2015-141296, a function of the optical sight and a function of the electronic view finder are realized by using different display apparatuses, respectively, and thus the image pickup apparatus becomes large in size.

SUMMARY OF THE INVENTION

The present disclosure provides a small-sized display apparatus which can change its function to an optical sight and to an electronic view finder, and an image pickup apparatus having the same.

A display apparatus according to one aspect of the present disclosure includes an image display element, an eyepiece portion, an object window, and a reflection optical element disposed at a position between the eyepiece portion and the object window, the reflection optical element being configured to guide a picture displayed on the image display element to the eyepiece portion. The reflection optical element changes a state to a first state and a second state by changing a transmittance. In the first state, the picture displayed on the image display element is viewed via the eyepiece portion. In the second state, an image in which an image from the object window and an image displayed on the image display element are superimposed is viewed via the eyepiece portion.

An image pickup apparatus according to another aspect of the present disclosure includes the above display apparatus.

Further features of the present invention will become apparent from the following description of exemplary embodiments with reference to the attached drawings.

DESCRIPTION OF THE EMBODIMENTS

Hereinafter, the embodiment of the present disclosure will be described in detail with reference to the drawings.

First Embodiment

Figure 1A:
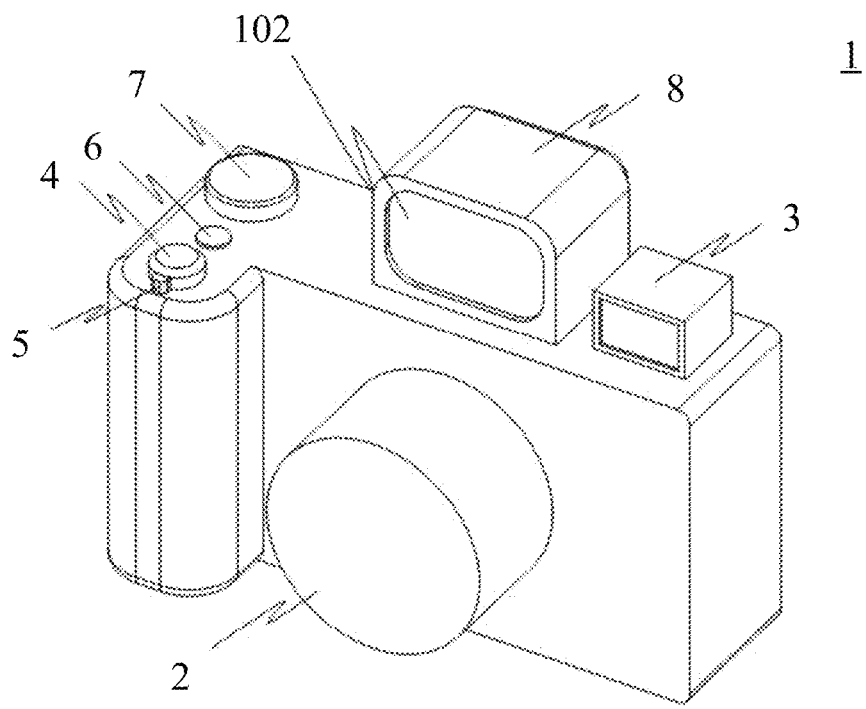
FIGS. 1A and 1B are extremal perspective views illustrating an image pickup apparatus according to each embodiment.
Figure 1B:
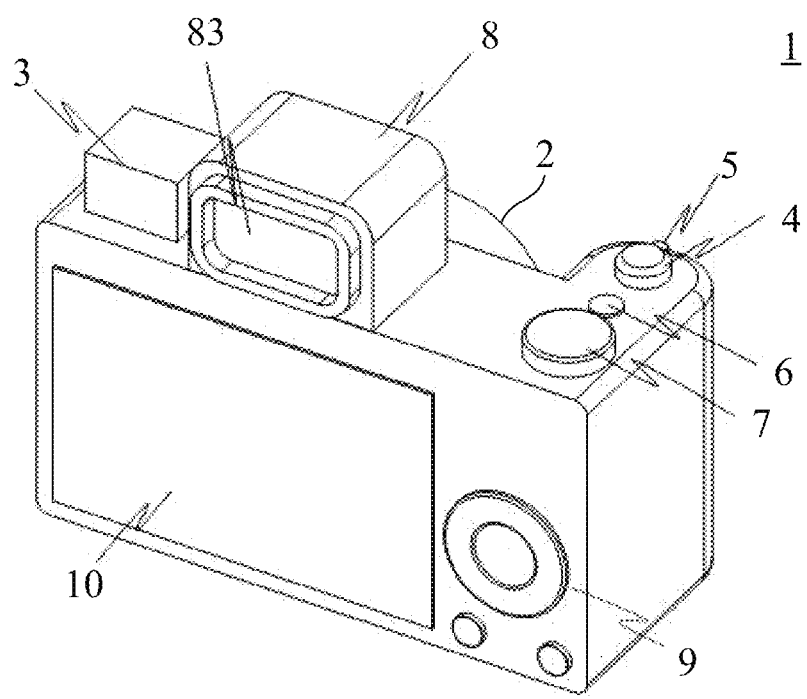

First, a description will be given of a configuration of an image pickup apparatus 1 according to a first embodiment of the present disclosure with reference to FIGS. 1A and 1B. FIGS. 1A and 1B are external perspective views illustrating the image pickup apparatus 1 in this embodiment. FIG. 1A is a front perspective view illustrating the image pickup apparatus 1, and FIG. 1B is a rear perspective view illustrating the image pickup apparatus 1.

The image pickup apparatus 1 includes an image sensor 21 (refer to FIGS. 2A and 2B), such as a CCD image sensor and a CMOS image sensor, configured to generate image data by photoelectrically converting an optical image, which is an object image, and a lens barrel unit 2 having an image pickup lens as an image pickup optical system configured to form the object image on the image sensor 21. The lens barrel unit 2 is retractable, and is extended from the image pickup apparatus 1 at a time of capturing an image and retracted into the image pickup apparatus 1 at a time of storage. Further, the image pickup apparatus 1 includes a main substrate and an auxiliary substrate (not illustrated) having processing circuits such as a main body controller 30 configured to convert image data generated by the image sensor 21 into digital information.

A flash apparatus 3 as an illumination apparatus is disposed on an upper part of the image pickup apparatus 1. When brightness of an object is insufficient at a time of capturing an image, the flash apparatus 3 emits light so as to make it possible to capture the image with a proper exposure even in a dark environment. A release button 4 is disposed on an upper surface of the image pickup apparatus 1 and is configured so that a two-step pressing operation can be performed. When a half-pressing operation as a first step is performed on the release button 4, an image pickup preparation operation such as a photometric operation, a distance measurement operation, and the like starts. When a full-pressing operation as a second step is performed on the release button 4, an image of an object is captured, and image data of the object image is stored in a built-in memory medium 23 (refer to FIGS. 2A and 2B).

A zoom lever 5 is held on an outer periphery of the release button 4. The zoom lever 5 is a rotational operation type lever. When the zoom lever 5 is rotationally operated in one direction, a zoom lens that configures at least part of the image pickup lens performs a zooming operation toward a telephoto side, which is a direction in which an angle of view becomes narrower, by moving in a direction along an optical axis OA (refer to FIGS. 2A and 2B). When the zoom lever 5 is rotationally operated in the other direction, the zoom lens performs a zooming operation toward a wide-angle side, which is a direction in which the angle of view becomes wider.

A power button 6 is a push button switch and is disposed on the upper surface of the image pickup apparatus 1. When the power button 6 is pressed by a user, the image pickup apparatus 1 switches from an off state, which is an unusable state, to an on state, which is an available state, or from the on state, which is the available state, to the off state, which is the unusable state. A mode setting dial 7 is disposed on the upper surface of the image pickup apparatus 1 and is supported rotatably for the image pickup apparatus 1. A plurality of icons (not illustrated) corresponding to various image pickup modes are printed on a top surface of the mode setting dial 7. When an icon is aligned with an index (not illustrated) on the image pickup apparatus 1, it is possible to perform a setting such as various modes and the like corresponding to the icon.

Figure 2B:
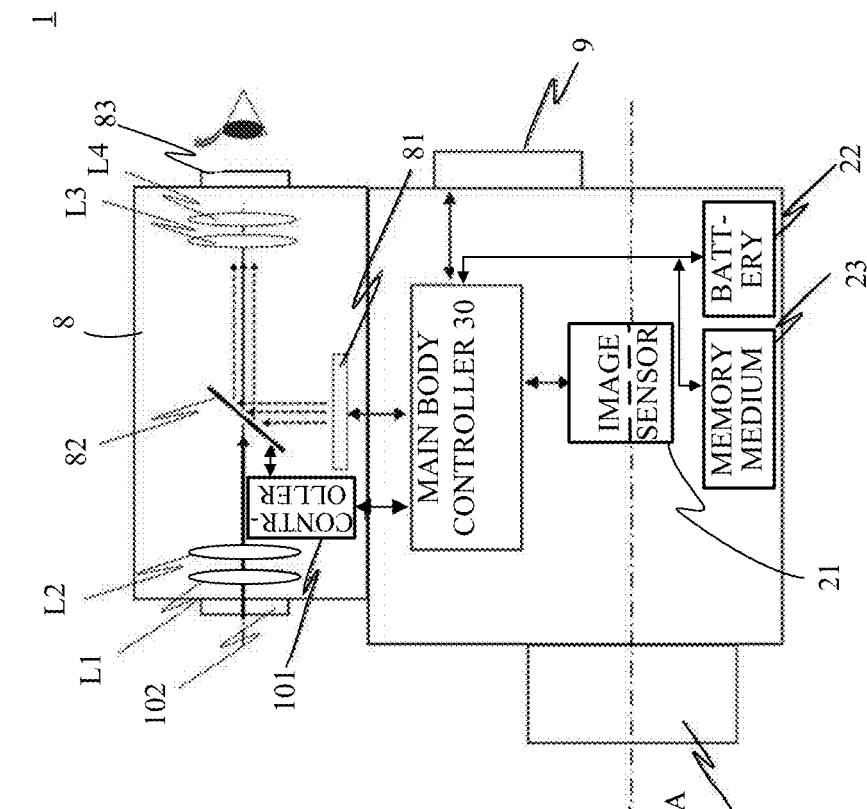
FIGS. 2A and 2B are block diagrams illustrating an image pickup apparatus according to a first embodiment.
Figure 2A:
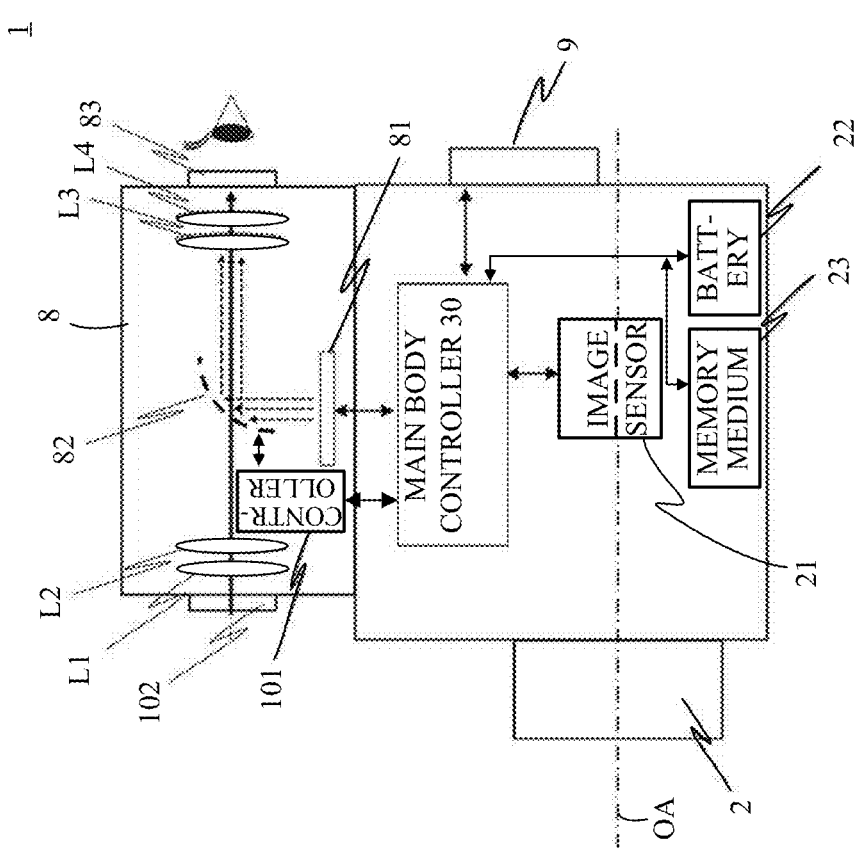

A hybrid display apparatus 8 is disposed on the upper part of the image pickup apparatus 1, and includes an eyepiece window 83 as an eyepiece portion and an object window 102. The details of the hybrid display apparatus 8 will be described later. An operation button 9 as an operation unit includes a plurality of buttons such as a single push button and a cross button. Functions are respectively assigned to buttons on the operation button 9. The operation button 9 is used for inputting various instructions such as instructions for changing an image pickup condition and for changing an image on the playback screen to the image data stored in the memory medium 23. A display apparatus 10 is disposed on a back side of the image pickup apparatus 1. The display apparatus 10 is, for example, a liquid crystal display, and is used for checking an object image to be captured and checking the captured image, as in an electronic view finder. As illustrated in FIGS. 2A and 2B, the image pickup apparatus 1 further includes a built-in battery 22 as a power source and the built-in memory medium 23 configured to store captured image data.

Next, a detailed description will be given of a configuration of the hybrid display apparatus 8 with reference to FIGS. 2A and 2B. FIGS. 2A and 2B are block diagrams illustrating the image pickup apparatus 1. FIG. 2A illustrates a state in which the hybrid display apparatus 8 functions as an optical sight, which will be also referred to as a second state hereinafter, and FIG. 2B illustrates a state in which the hybrid display apparatus 8 functions as an electronic view finder, which will be also referred to as a first state hereinafter.

The hybrid display apparatus 8 includes an organic EL panel 81, a plurality of lenses L1, L2, L3, and L4, a light control mirror 82, an eyepiece window 83, a controller 101, and an object window 102 inside, and is configured to change its function to an optical sight function and to an electronic view finder function. As illustrated in FIG. 2B, when the hybrid display apparatus 8 functions as an electronic view finder, the user can look in the eyepiece window 83 to check an object image of an image pickup object displayed on the organic EL panel 81 or to check the captured image. On the other hand, when the hybrid display apparatus 8 functions as an optical sight as illustrated in FIG. 2A, light from the object window 102 is transmitted, and the organic EL panel 81 emits an optical sight mark 103 (refer to FIGS. 3A and 3B) to the light control mirror 82 so that the optical sight mark 103 is superimposed on the light from the object window 102. Thereby, object tracking can be assisted.

The light control mirror 82 is a reflection optical element which is disposed between the eyepiece window 83 and the object window 102 and is configured to guide an image displayed on the organic EL panel 81 to the eyepiece window 83. The light control mirror 82 is formed by filling a space between glasses, on which ITO (indium tin oxide) films are formed, with an electrolyte containing silver, and the silver is deposited/eluted by turning voltage on/off so that a state of the light control mirror 82 can be changed to a mirror state and to a half mirror state. Further, the light control mirror 82 in this embodiment includes a piezo thin film (not illustrated) formed on its surface. Therefore, the light control mirror 82 can change from a parabolic shape curved toward an object side. i.e., a curved surface shape which is convex toward the object side, to a flat shape, i.e., a planar surface shape, based on an applied voltage to the piezo thin film. The controller 101 is a light control mirror controller configured to change the voltage applied to the light control mirror 82 based on a signal from the main body controller 30 which is a camera controller. The controller 101 can change the light control mirror 82 to the mirror state or to the half mirror state, and can change the shape from the parabolic shape curved toward the object side to the flat shape.

When the hybrid display apparatus 8 is set so as to function as the electronic view finder by a predetermined operation on the operation button 9 by the user, the controller 101 controls the voltage applied to the light control mirror 82 so that the light control mirror 82 is in the mirror state and has the flat shape. As a result, the light control mirror 82 becomes the mirror state and has the flat shape, that is, becomes the first state. The organic EL panel 81 displays image data stored in the memory medium 23, or image data continuously generated by the image sensor 21, which is a so-called live view image, toward the light control mirror 82, based on a control by the main body controller 30. Since the light control mirror 82 is in the mirror state and has the flat shape, the image displayed on the organic EL panel 81 is reflected by the light control mirror 82 toward the eyepiece window 83, and the hybrid display apparatus 8 functions as the electronic view finder.

On the other hand, when the hybrid display apparatus 8 is set so as to function as the optical sight by a predetermined operation on the operation button 9 by the user, the controller 101 controls the applied voltage so that the light control mirror 82 is in the half mirror state and has the parabolic shape curved toward the object side. As a result, the light control mirror 82 becomes the half mirror state and has the parabolic shape curved toward the object side, that is, becomes the second state.

Figure 3A:
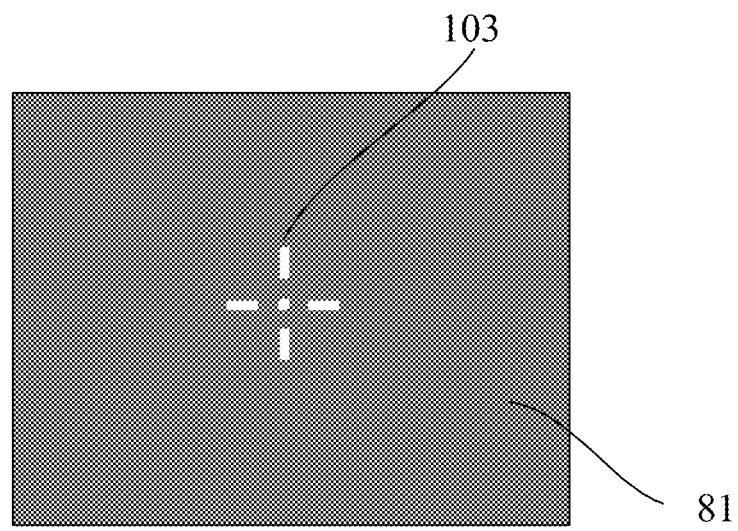
FIGS. 3A and 3B are display examples of a display apparatus according to each embodiment.
Figure 3B:
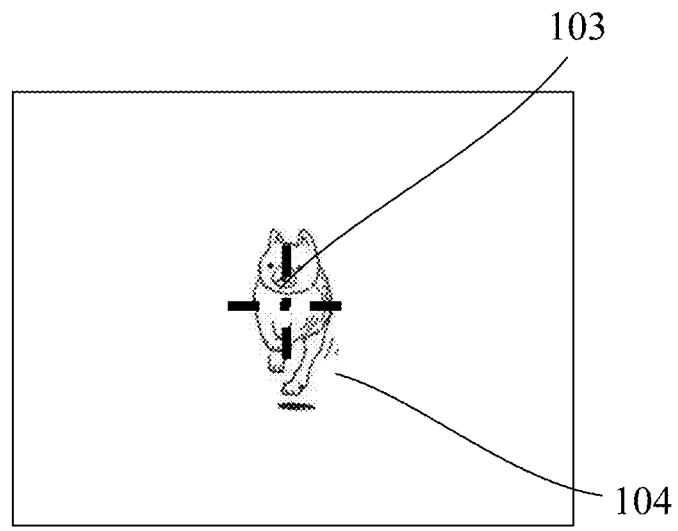

Next, display examples of the hybrid display apparatus 8 will be described with reference to FIGS. 3A and 3B. FIGS. 3A and 3B are the display examples of the hybrid display apparatus 8. FIG. 3A illustrates a display example of the organic EL panel 81 when the hybrid display apparatus 8 is set so as to function as the optical sight, and FIG. 3B illustrates an example of an image viewed by the user from the eyepiece window 83 when the hybrid display apparatus 8 is set so as to function as the optical sight.

As illustrated in FIG. 3A, when the hybrid display apparatus 8 is set so as to function as the optical sight, the organic EL panel 81 displays the optical sight mark 103, which is a predetermined mark, at a position corresponding to an approximate center of an angle of view which is captured by the image sensor 21, and displays the other areas in black. Since the light control mirror 82 is in the half mirror state, the light control mirror 82 transmits the light from the object window 102 of the image pickup apparatus 1, and reflects the optical sight mark 103 displayed on the organic EL panel 81 toward the eyepiece window 83 so that the optical sight mark 103 is superimposed on the light from the object window 102. At this time, since the light control mirror 82 has the parabolic shape curved toward the object side, the reflected light becomes a parallel light ray, and the reflected image of the optical sight mark 103 appears at a fixed position in the eyepiece window 83 regardless of a position of a user's eye. As illustrated in FIG. 3B, the optical sight mark 103 is reflected by the light control mirror 82 and is viewed from the eyepiece window 83, and an image 104 of the object, which is a dog in this example, is viewed by the light from the object window 102. In this way, the eyepiece window 83 functions as both an eyepiece window of the electronic view finder and an eyepiece window of the optical sight.

The object window 102 transmits and guides the light from the object side into an inside of the hybrid display apparatus 8. Specifically, the object window 102 is a flat surface, and is made of, for example, glass or plastic. The eyepiece window 83 transmits the light from the light control mirror 82. Specifically, the eyepiece window 83 is a flat surface, and is made of, for example, glass or plastic.

As described above, in this embodiment, the light control mirror 82 can change to the first state and to the second state by changing the transmittance. In the first state, the image (picture) displayed on the organic EL panel 81 can be viewed via the eyepiece window 83. In the second state, the image in which the image 104 from the object window 102 and the image, which is the optical sight mark 103, displayed on the organic EL panel 81 are superimposed can be viewed via the eyepiece window 83. With the above configuration, the hybrid display apparatus 8 in this embodiment functions not only as the electronic view finder but also as the optical sight.

Second Embodiment

Next, a description will be given of an image pickup apparatus 1a according to a second embodiment of the present disclosure. The image pickup apparatus 1a in this embodiment is different from the image pickup apparatus 1 in the first embodiment in that it has a hybrid display apparatus 8a instead of the hybrid display apparatus 8. The other configurations of the image pickup apparatus 1a in this embodiment are the same as those of the image pickup apparatus 1 in the first embodiment, and therefore a description thereof will be omitted.

Figure 4A:
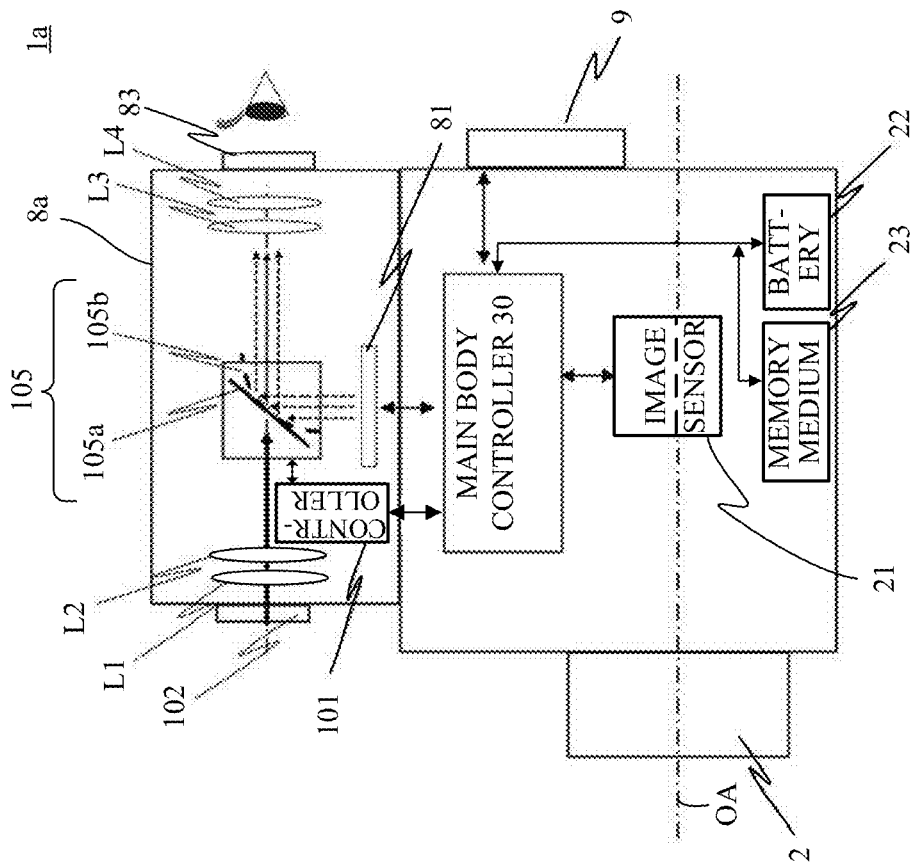
FIGS. 4A and 4B are block diagrams illustrating an image pickup apparatus according to a second embodiment.
Figure 4B:
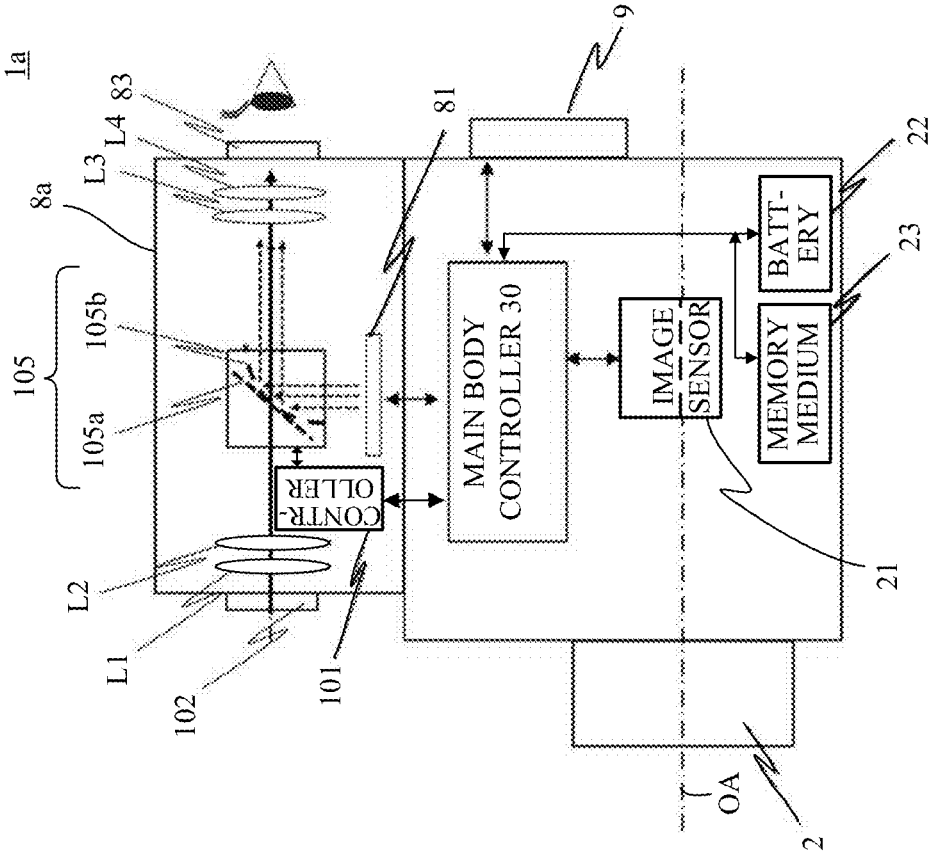

A detailed configuration of the hybrid display apparatus 8a will be described with reference to FIGS. 4A and 4B. FIGS. 4A and 4B are block diagrams illustrating the image pickup apparatus 1a. FIG. 4A illustrates a state in which the hybrid display apparatus 8a functions as an optical sight, and FIG. 4B illustrates a state in which the hybrid display apparatus 8a functions as an electronic view finder.

The hybrid display apparatus 8a includes an organic EL panel 81, a plurality of lenses L1, L2, L3, and L4, a light control mirror 105, an eyepiece window 83, a controller 101, and an object window 102 inside. The light control mirror 105 is a reflection optical element which is disposed between the eyepiece window 83 and the object window 102, is configured to guide an image displayed on the organic EL panel 81 to the eyepiece window 83, and includes a first light control mirror 105a, which is also referred to as a first reflection optical element, and a second light control mirror 105b, which is also referred to as a second reflection optical element.

The first light control mirror 105a is formed by filling a space between glasses, on which ITO films are formed, with an electrolyte containing silver, and the silver is deposited/eluted by turning voltage on/off so that a state of the first light control mirror 105a can be changed to a mirror state and to a transparent glass state. A shape of the first light control mirror 105a is a flat shape, i.e., a planar surface shape. On the other hand, the second light control mirror 105b is formed by filling a space between glasses, on which ITO films are formed, with an electrolyte containing silver, and the silver is deposited/eluted by turning voltage on/off so that a state of the second light control mirror 105b can be changed to a half mirror state and a transparent glass state. A shape of the second light control mirror 105b is a parabolic shape curved toward an object side, i.e., a curved surface shape which is convex toward the object side. The controller 101 is a light control mirror controller configured to change the voltage applied to the first light control mirror 105a and the second light control mirror 105b based on a signal from a main body controller 30. The controller 101 can change the first light control mirror 105a to the mirror state or to the transparent glass state, and can change the second light control mirror 105b to the half mirror state and to the transparent glass state.

When the hybrid display apparatus 8a is set so as to function as the electronic view finder by a predetermined operation on an operation button 9 by a user, the controller 101 controls the voltage so that the first light control mirror 105a is in the mirror state and that the second light control mirror 105b is in the transparent glass state. As a result, the first light control mirror 105a becomes the mirror state, i.e., a total reflection state, and the second light control mirror 105b becomes the transparent glass state, i.e., a total transmission state. The organic EL panel 81 displays image data stored in a memory medium 23 or image data continuously generated by an image sensor 21, which is a so-called live view image, toward the first light control mirror 105a and the second light control mirror 105b, based on a control by the main body controller 30. Since the second light control mirror 105b is in the transparent glass state, the image displayed on the organic EL panel 81 passes through the second light control mirror 105b as it is. On the other hand, since the first light control mirror 105a is in the mirror state and has the flat shape, the image transmitted through the second light control mirror 105b is reflected by the first light control mirror 105a toward the eyepiece window 83, and the hybrid display apparatus 8a functions as the electronic view finder. At this time, the state of the light control mirror 105, i.e., the first light control mirror 105a and the second light control mirror 105b, is referred to as a first state.

On the other hand, when the hybrid display apparatus 8a is set so as to function as the optical sight by a predetermined operation on the operation button 9 by the user, the controller 101 controls the voltage applied to the light control mirror 105 so that the hybrid display apparatus 8a functions as the optical sight. That is, the controller 101 controls the applied voltage so that the first light control mirror 105a is in the transparent glass state, i.e., the total transmission state, and that the second light control mirror 105b is in the half mirror state, i.e., the half transmission state. As a result, the first light control mirror 105a becomes the transparent glass state, and the second light control mirror 105b becomes the half mirror state. At this time, a state of the light control mirror 105, i.e., the first light control mirror 105a and the second light control mirror 105b, is referred to as a second state.

As illustrated in FIG. 3A, when the hybrid display apparatus 8a is set so as to function as the optical sight, the organic EL panel 81 displays an optical sight mark 103 at a position corresponding to an approximate center of an angle of view which is captured by the image sensor 21, and displays the other areas in black. Since the first light control mirror 105a is in the transparent glass state, the first light control mirror 105a transmits light from the object window 102 of the image pickup apparatus 1a as it is. Since the second light control mirror 105b is in the half mirror state, the second light control mirror 105b transmits the light from the object window 102 of the image pickup apparatus 1a, and reflects the optical sight mark 103 displayed on the organic EL panel 81 toward the eyepiece window 83 so that the optical sight mark 103 is superimposed on the light from the object window 102. At this time, since the second light control mirror 105b has the parabolic shape curved toward the object side, the reflected light becomes a parallel light ray and the reflected image of the optical sight mark 103 appears at a fixed position in the eyepiece window 83 regardless of a position of a users eye.

As described above, in this embodiment, the light control mirror 105 includes the first light control mirror 105a having the planar surface shape and the second light control mirror 105b having the curved surface shape. In the first state, the first light control mirror 105a is in the total reflection state, and the second light control mirror 105b is in the total transmission state. On the other hand, in the second state, the first light control mirror 105a is in the total transmission state, and the second light control mirror 105b is in the half transmission state. With the above configuration, the hybrid display apparatus 8a in this embodiment functions not only as the electronic view finder but also as the optical sight.

Third Embodiment

Next, a description will be given of an image pickup apparatus 1b according to a third embodiment of the present disclosure. The image pickup apparatus b in this embodiment is different from the image pickup apparatus 1 in the first embodiment in that it has a hybrid display apparatus 8b instead of the hybrid display apparatus 8. The other configurations of the image pickup apparatus 1b in this embodiment are the same as those of the image pickup apparatus 1 in the first embodiment, and therefore a description thereof will be omitted.

Figure 5A:
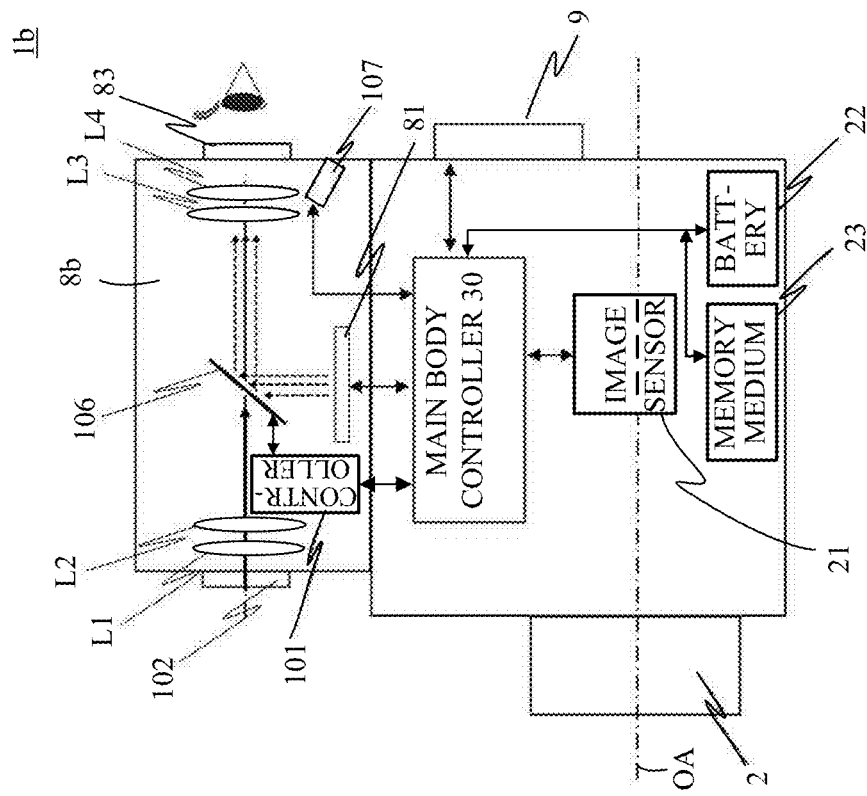
FIGS. 5A and 5B are block diagrams illustrating an image pickup apparatus according to a third embodiment.
Figure 5B:
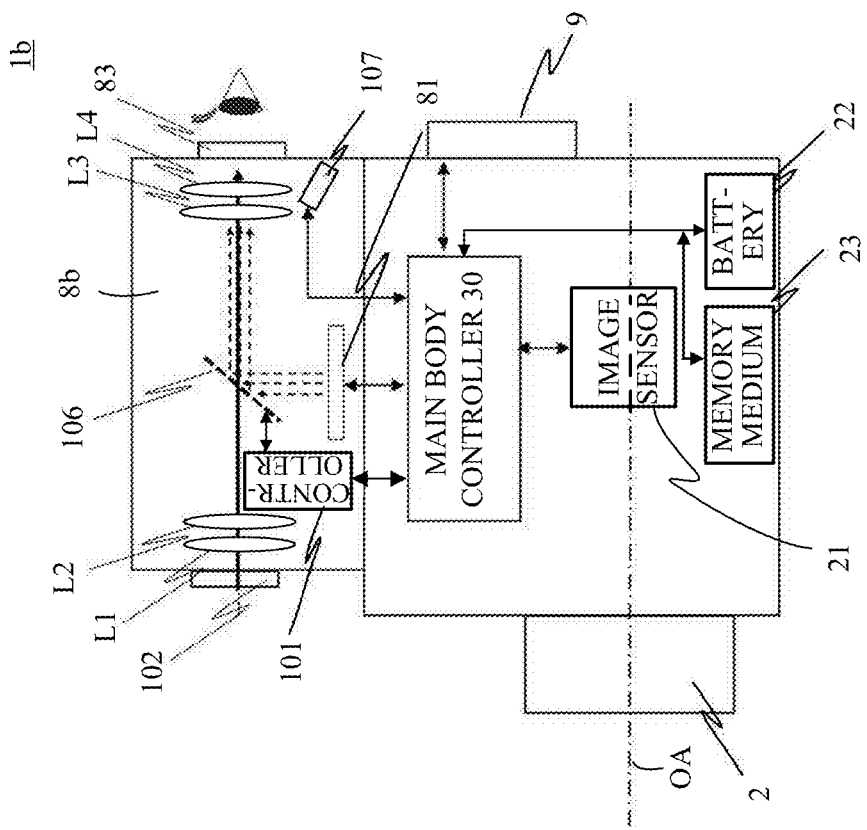

A detailed configuration of the hybrid display apparatus 8b will be described with reference to FIGS. 5A and 5B. FIGS. 5A and 5B are block diagrams illustrating the image pickup apparatus 1b. FIG. 5A illustrates a state in which the hybrid display apparatus 8b functions as an optical sight, and FIG. 5B illustrates a state in which the hybrid display apparatus 8b functions as an electronic view finder.

The hybrid display apparatus 8b includes an organic EL panel 81, a plurality of lenses L1, L2, L3, and L4, a light control mirror 106, an eyepiece window 83, a controller 101, an object window 102, and an eye-ball position detector 107.

The light control mirror 106 is a reflection optical element which is disposed between the eyepiece window 83 and the object window 102 and is configured to guide an image displayed on the organic EL panel 81 to the eyepiece window 83. The light control mirror 106 is formed by filling a space between glasses, on which ITO films are formed, with an electrolyte containing silver, and the silver is deposited/eluted by turning voltage on/off, so that a state of the light control mirror 106 can be changed to a mirror state and a half mirror state. A shape of the light control mirror 106 is a flat shape, i.e., a planar surface shape. The controller 101 is a light control mirror controller configured to change the voltage applied to the light control mirror 106 based on a signal from a main body controller 30. The controller 101 can change the light control mirror 106 to the mirror state and to the half mirror state.

The eye-ball position detector 107 is configured to detect a position of a user's eye ball relative to the eyepiece window 83 by, for example, detecting a reflection of infrared light projected on the eye ball. However, the eye-ball position detector 107 may not use this method, and various methods may be used.

When the hybrid display apparatus 8b is set so as to function as the electronic view finder by a predetermined operation on an operation button 9 by a user, the controller 101 controls the voltage applied to the light control mirror 106 so that the light control mirror 106 is in the mirror state. As a result, the light control mirror 106 becomes the mirror state, which is also referred to as a first state. The organic EL panel 81 displays image data stored in a memory medium 23 or image data continuously generated by an image sensor 21, which is a so-called live view image, toward the light control mirror 106, based on a control by the main body controller 30. Since the light control mirror 106 is in the mirror state and has the flat shape, the image displayed on the organic EL panel 81 is reflected by the light control mirror 106 toward the eyepiece window 83, and the hybrid display apparatus 8b is functions as the electronic view finder.

On the other hand, when the hybrid display apparatus 8b is set so as to function as the optical sight by a predetermined operation on the operation button 9 by the user, the controller 101 controls the applied voltage so that the light control mirror 106 is in the half mirror state. As a result, the light control mirror 106 becomes the half mirror state, which is also referred to as a second state.

As illustrated in FIG. 3A, when the hybrid display apparatus 8b is set so as to function as the optical sight, the organic EL panel 81 displays an optical sight mark 103 and displays the other areas in black. Since the light control mirror 106 is in the half mirror state, the light control mirror 106 transmits light from the object window 102 of the image pickup apparatus 1b, and reflects the optical sight mark 103 displayed on the organic EL panel 81 toward the eyepiece window 83 so that the optical sight mark 103 is superimposed on the light from the object window 102. At this time, the light control mirror 106 has the flat shape instead of a parabolic shape curved toward an object side like the light control mirror 82 in the first embodiment. Hence, the reflected light does not become a parallel light ray, and the reflected image of the optical sight mark 103 may appear to move its position in the eyepiece window 83 depending on the position of the user's eye, which makes the hybrid display apparatus difficult to handle as the optical sight. Thus, in this embodiment, in the second state, a display position of the optical sight mark 103 on the organic EL panel 81 is moved based on the position of the user's eye ball detected by the eye-ball position detector 107. As a result, the reflected image of the optical sight mark 103 can appear at a fixed position in the eyepiece window 83 regardless of the position of the user's eyes.

With the above configuration, the hybrid display apparatus 8b in this embodiment functions not only as the electronic view finder but also as the optical sight.

Fourth Embodiment

Next, a description will be given of an image pickup apparatus 1c according to a fourth embodiment of the present disclosure. The image pickup apparatus 1c in this embodiment is different from the image pickup apparatus 1 in the first embodiment in that it has a hybrid display apparatus 8c instead of the hybrid display apparatus 8. The other configurations of the image pickup apparatus 1c in this embodiment are the same as those of the image pickup apparatus 1 in the first embodiment, and therefore a description thereof will be omitted.

Figure 6A:
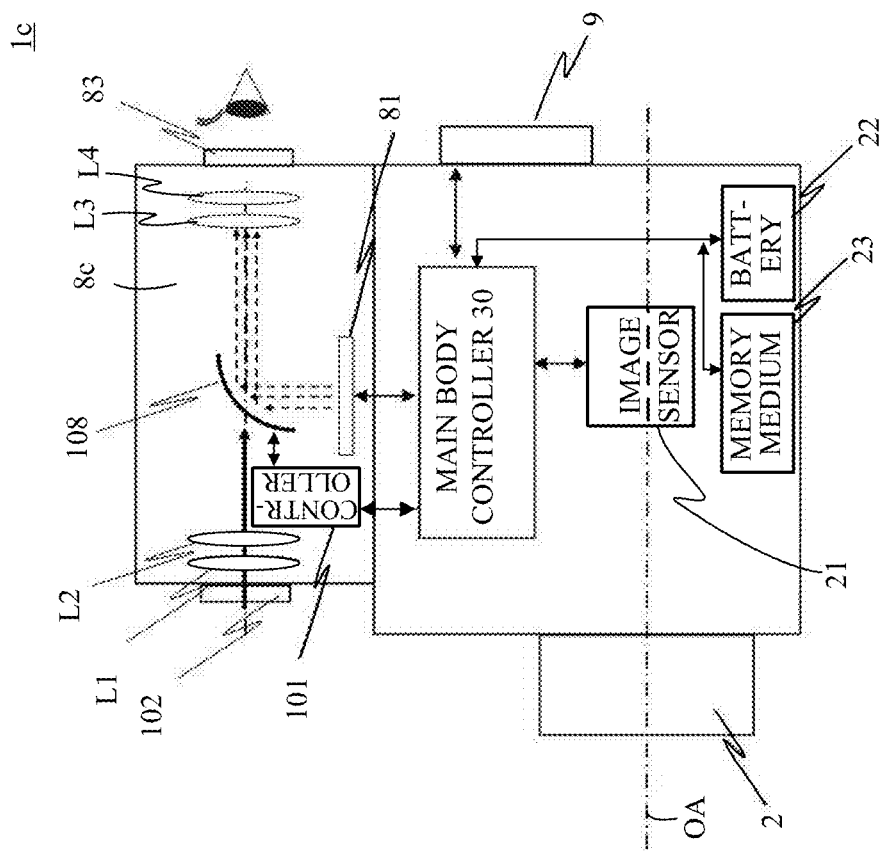
FIGS. 6A and 6B are block diagrams illustrating an image pickup apparatus according to a fourth embodiment.
Figure 6B:
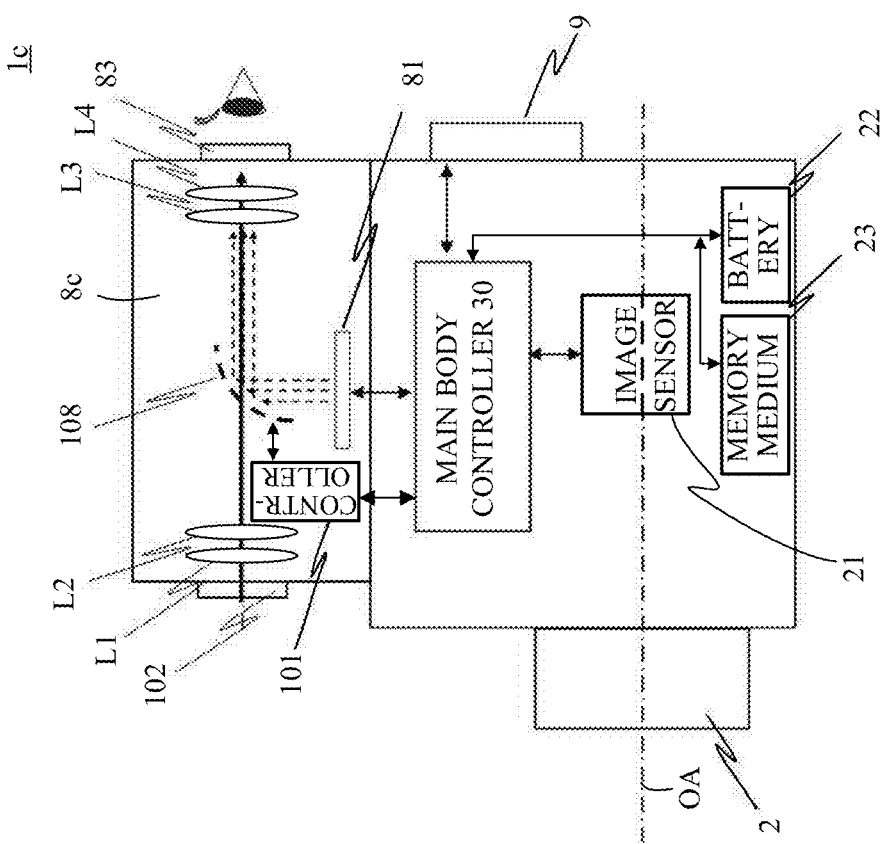

A detailed configuration of the hybrid display apparatus 8c will be described with reference to FIGS. 6A and 6B. FIGS. 6A and 6B are block diagrams illustrating the image pickup apparatus 1c. FIG. 6A illustrates a state in which the hybrid display apparatus 8c functions as an optical sight, and FIG. 6B illustrates a state in which the hybrid display apparatus 8c functions as an electronic view finder.

The hybrid display apparatus 8c includes an organic EL panel 81, a plurality of lenses L1, L2, L3, and L4, a light control mirror 108, an eyepiece window 83, a controller 101, and an object window 102 inside.

The light control mirror 108 is a reflection optical element which is disposed between the eyepiece window 83 and the object window 102 and is configured to guide an image displayed on the organic EL panel 81 to the eyepiece window 83. The light control mirror 108 is formed by filling a space between glasses, on which ITO films are formed, with an electrolyte containing silver, and the silver is deposited/eluted by turning voltage on/off, so that a state of the light control mirror 108 can be changed to a mirror state and a half mirror state. A shape of the light control mirror 108 is a parabolic shape curved toward an object side, i.e., a curved surface shape which is convex toward the object side. The controller 101 can change the light control mirror 108 to the mirror state and to the half mirror state by changing the voltage applied to the light control mirror 108 based on a signal from a main body controller 30.

When the hybrid display apparatus 8c is set so as to function as the electronic view finder by a predetermined operation on an operation button 9 by a user, the controller 101 controls the voltage applied to the light control mirror 108 so that the light control mirror 108 is in the mirror state. As a result, the light control mirror 108 becomes the mirror state, which is also referred to as a first state. The organic EL panel 81 displays image data stored in a memory medium 23 or image data continuously generated by an image sensor 21, which is a so-called live view image, toward the light control mirror 108, based on a control by the main body controller 30. Since the light control mirror 108 is in the mirror state, the image displayed on the organic EL panel 81 is reflected by the light control mirror 108 toward the eyepiece window 83 and can be viewed from the eyepiece window 83.

Here, since the light control mirror 108 has the parabolic shape curved toward the object side, if the image is displayed on the organic EL panel 81 as usual, the image reflected by the light control mirror 108 is appeared to be distorted. Therefore, in this embodiment, the image displayed on the organic EL panel 81 is deformed so that the image reflected by the light control mirror 108, which has the parabolic shape curved toward the object side, looks like a normal image. As a result, the hybrid display apparatus 8c functions as the electronic view finder.

On the other hand, when the hybrid display apparatus 8c is set so as to function as the optical sight by a predetermined operation on the operation button 9 by the user, the controller 101 controls the applied voltage so that the light control mirror 108 is in the half mirror state. As a result, the light control mirror 108 becomes the half mirror state, which is also referred to as a second state.

As illustrated in FIG. 3A, when the hybrid display apparatus 8c is set so as to function as the optical sight, the organic EL panel 81 displays an optical sight mark 103 at a position corresponding to an approximate center of an angle of view which is captured by the image sensor 21, and displays the other areas in black. Since the light control mirror 108 is in the half mirror state, the light control mirror 108 transmits light from the object window 102 of the image pickup apparatus 1c, and reflects the optical sight mark 103 displayed on the organic EL panel 81 toward the eyepiece window 83 so that the optical sight mark 103 is superimposed on the light from the object window 102. At this time, since the light control mirror 108 has the parabolic shape curved toward the object side, the reflected light becomes a parallel light ray, and the reflected image of the optical sight mark 103 appears at a fixed position in the eyepiece window 83 regardless of a position of a user's eye.

With the above configuration, the hybrid display apparatus 8c in this embodiment functions not only as the electronic view finder but also as the optical sight.

Fifth Embodiment

Next, a description will be given of an image pickup apparatus 1d according to a fifth embodiment of the present disclosure. The image pickup apparatus 1d in this embodiment is different from the image pickup apparatus 1 in the first embodiment in that it has a hybrid display apparatus 8d instead of the hybrid display apparatus 8. The other configurations of the image pickup apparatus 1d in this embodiment are the same as those of the image pickup apparatus 1 in the first embodiment, and therefore a description thereof will be omitted.

Figure 7B:
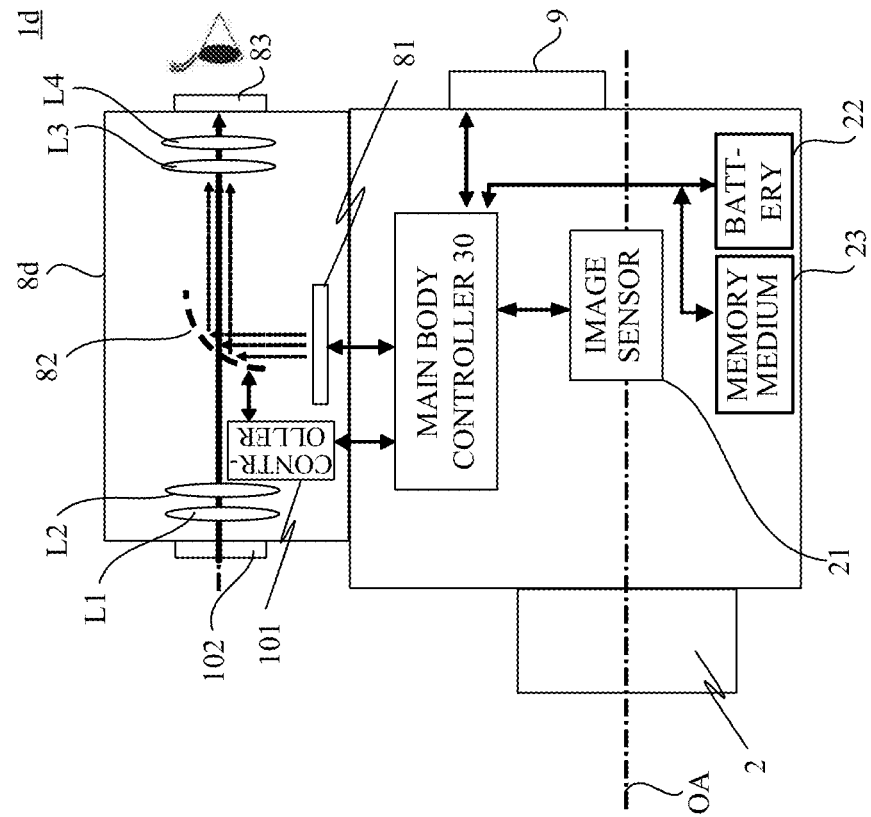
FIGS. 7A and 7B are block diagrams illustrating an image pickup apparatus according to a fifth embodiment.
Figure 7A:
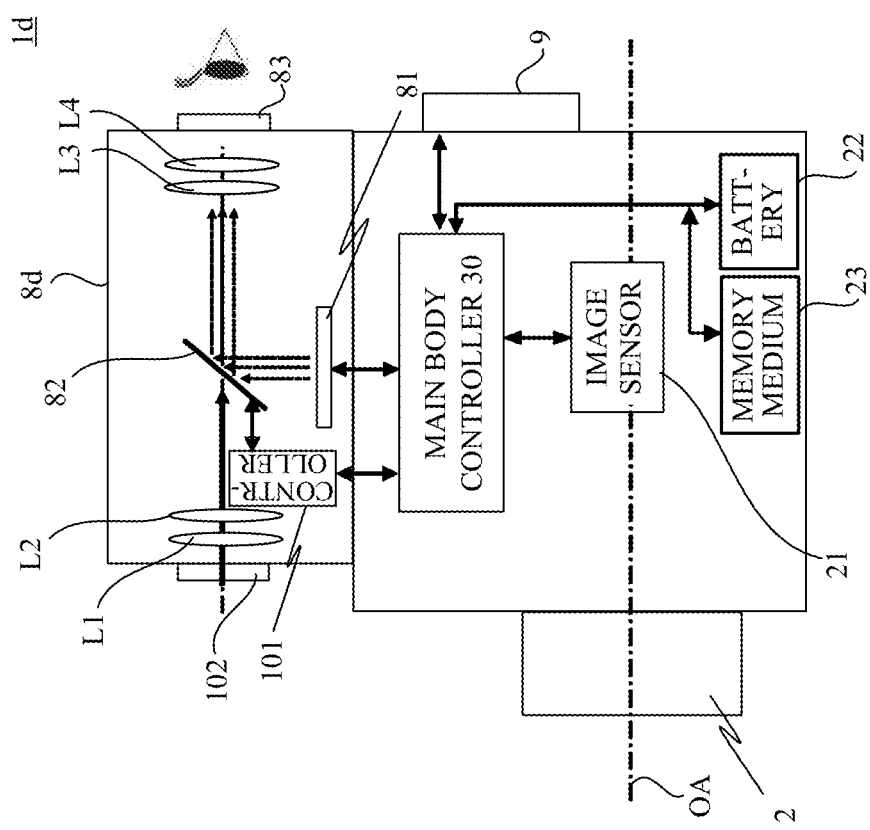

A detailed configuration of the hybrid display apparatus 8d will be described with reference to FIGS. 7A and 7B. FIGS. 7A and 7B are block diagrams illustrating the image pickup apparatus 1d. FIG. 7A illustrates a state in which the hybrid display apparatus 8d functions as an electronic view finder, and FIG. 7B illustrates a state in which the hybrid display apparatus 8d functions as an optical sight.

The image pickup apparatus 1d includes a built-in battery 22 as a power source and a built-in memory medium 23 configured to store acquired image data.

The hybrid display apparatus 8d includes an organic EL panel 81 as a display panel, a light control mirror 82 as a reflection optical element, an eyepiece window 83 as an eyepiece portion, a light control mirror controller 101, an object window 102, and a plurality of lenses L1, L2, L3, and L4. When the hybrid display apparatus 8d functions as the electronic view finder, a user can check an object image to be captured and a captured image, each of which is displayed on the organic EL panel 81, by looking in the eyepiece window 83. On the other hand, when the hybrid display apparatus 8d functions as the optical sight, the organic EL panel 81 emits an optical sight mark 103, which will be described later, to the light control mirror 82 so that the optical sight mark 103 is superimposed on light from the object window 102. Thereby, object tracking can be assisted.

The light control mirror 82 is configured to change to a mirror state and to a half mirror state when voltage is turned on/off. Further, the light control mirror 82 has a piezo thin film (not illustrated) formed on its surface, and is configured to deform its shape into a state of a parabolic shape curved toward an object side and into a flat state, depending on the voltage applied to the piezo thin film.

The light control mirror controller 101 is configured to change the voltage applied to the light control mirror 82 based on a signal from a main body controller 30, so as to change the state of the light control mirror 82 to the mirror state and to the half mirror state, and so as to deform the shape of the light control mirror 82 into the state of the parabolic shape curved toward the object side and into the flat state.

The object window 102 transmits and guides the light from the object into an inside of the hybrid display apparatus 8*d*. Specifically, the object window 102 is a flat surface, and is made of, for example, glass or plastic.

The eyepiece window 83 transmits the light from the light control mirror 82. Specifically, the eyepiece window 83 is a flat surface, and is made of, for example, glass or plastic.

The lenses L3 and L4 are disposed in a direction of the eyepiece window 83 from the light control mirror 82, and the lenses L1 and L2 are disposed in a direction of the object window 102 from the light control mirror 82. A lens unit including the lenses L3 and L4 acts as an enlargement lens configured to enlarge an image transmitted from the object window 102 side. A lens unit including the lenses L1 and L2 acts as a reduction lens configured to reduce an image transmitted from the object window 102 side. A reciprocal of an enlargement magnification of the lenses L3 and L4 is made to be the same as a reduction magnification of the lenses L 1 and L2. Here, the term "same" includes not only a case of being exactly the same but also a case of being substantially the same.

When the hybrid display apparatus 8*d* is set so as to function as the electronic view finder, the light control mirror controller 101 controls the voltage applied to the light control mirror 82 so that the light control mirror 82 is in the mirror state and has the flat shape. The organic EL panel 81 displays image data stored in the memory medium 23 or image data continuously generated by an image sensor 21, which is a so-called live view image, based on a control by the main body controller 30. Since the light control mirror 82 is in the mirror state and has the flat shape, the image displayed on the organic EL panel 81 is reflected by the light control mirror 82 toward the eyepiece window 83. The image displayed on the organic EL panel 81 reaches the eyepiece window 83 after passing through the lenses L3 and L4 which act as the enlargement lens. As a result, the displayed image viewed from the eyepiece window 83 is larger than the image displayed on the organic EL panel 81. That is, the visibility of the displayed image viewed from the eyepiece window 83 is improved.

When the hybrid display apparatus 8*d* is set so as to function as the optical sight, the light control mirror controller 101 controls the voltage applied to the light control mirror 82 so that the light control mirror 82 is in the half mirror state and has the parabolic shape curved toward the object side.

When the hybrid display apparatus 8*d* functions as the optical sight, the light from the object window 102 passes through the lenses L3 and L4 which act as the enlargement lens, and thus the image from the object window 102 is enlarged. In this embodiment, since the lenses L and L2 acting as the reduction lens are arranged in the direction of the object window 102 from the light control mirror 82, the image from the object window 102 is temporarily reduced. Thereafter, the image from the object window 102 is transmitted through the light control mirror 82 and then enlarged by the action of the lenses L3 and L4 so that the reduction by the lenses L1 and L2 is cancelled. With such a configuration, in this embodiment, the image from the object window 102 is not enlarged when the hybrid display apparatus 8*d* functions as an optical sight. That is, the image from the object window 102 can be viewed from the eyepiece window 83 at the same magnification. Here, the same magnification includes not only a case where the magnification is exactly the same, but also a case where the magnification is substantially the same.

As described above, according to the configuration of this embodiment, it is possible to realize the small-sized hybrid display apparatus 8*d* which can change its function to the optical sight and to the electronic view finder, and the image pickup apparatus 1*d* having the same.

Sixth Embodiment

Next, a description will be given of an image pickup apparatus 1*e* according to a sixth embodiment of the present disclosure. The image pickup apparatus 1*e* in this embodiment is different from the image pickup apparatus 1 in the first embodiment in that it has a hybrid display apparatus 8*e* instead of the hybrid display apparatus 8. The other configurations of the image pickup apparatus 1*e* in this embodiment are the same as those of the image pickup apparatus 1 in the first embodiment, and therefore a description thereof will be omitted.

Figure 8B:
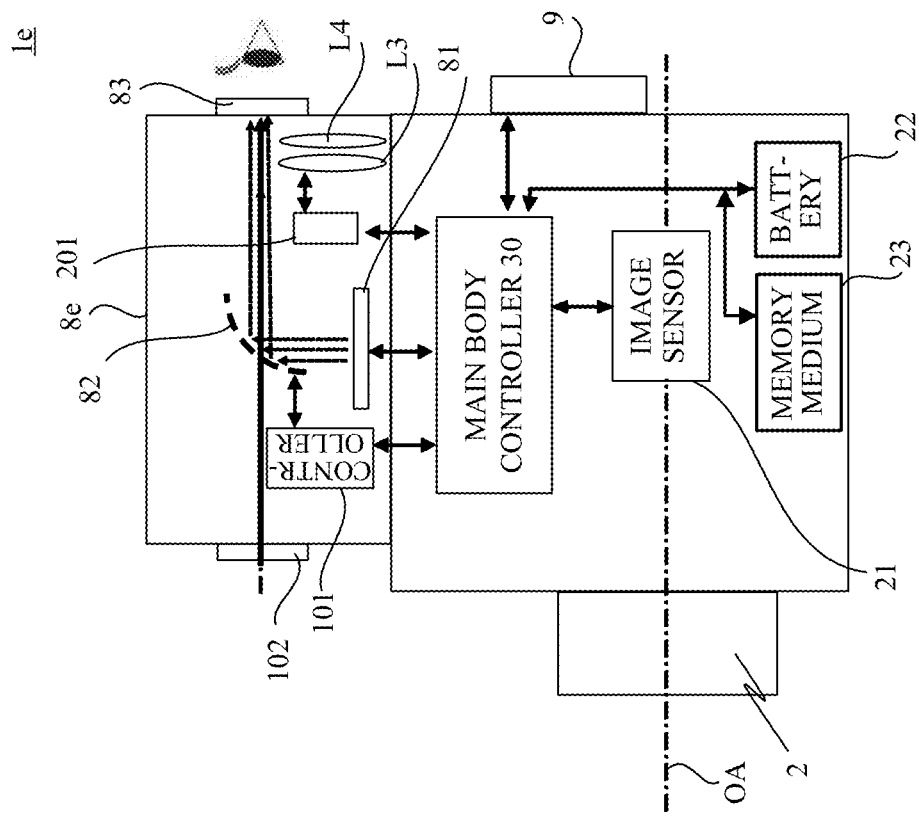
FIGS. 8A and 8B are block diagrams illustrating an image pickup apparatus according to a sixth embodiment.
Figure 8A:
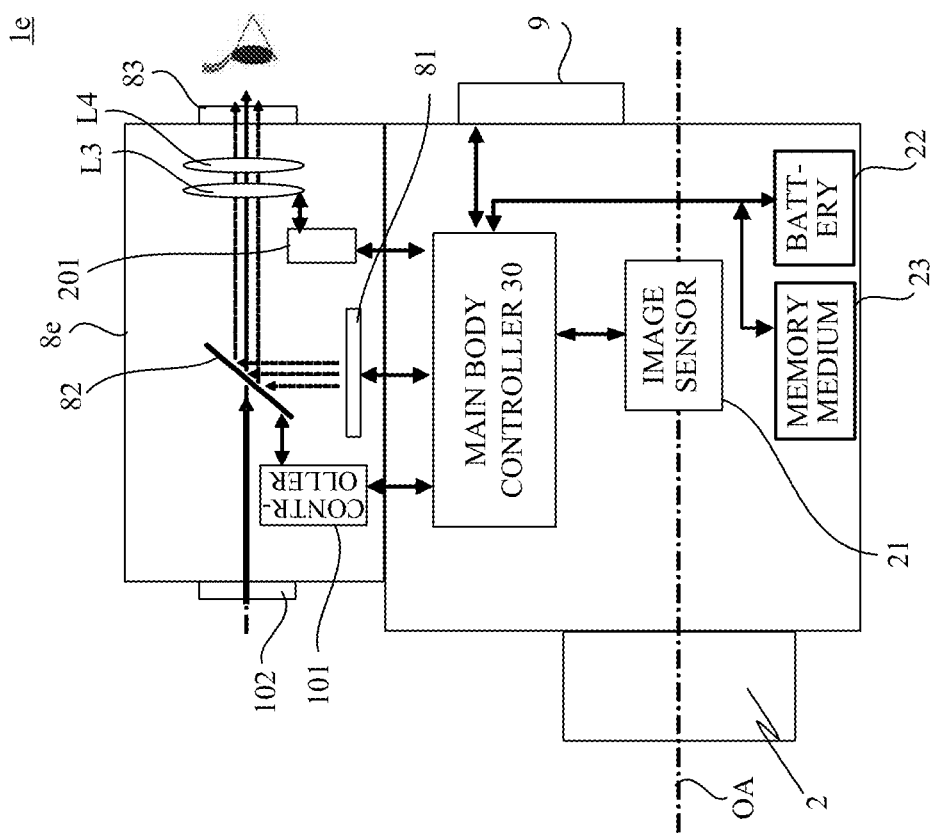

A detailed configuration of the hybrid display apparatus 8*e* will be described with reference to FIGS. 8A and 8B. FIGS. 8A and 8B are block diagrams illustrating the image pickup apparatus 1*e*. FIG. 8A illustrates a state in which the hybrid display apparatus 8*e* functions as an electronic view finder, and FIG. 8B illustrates a state in which the hybrid display apparatus 8*e* functions as an optical sight.

The hybrid display apparatus 8*e* includes an organic EL panel 81 as a display panel, a light control mirror 82 as a reflection optical element, an eyepiece window 83 as an eyepiece portion, a light control mirror controller 101, an object window 102, lenses L3 and L4, and a lens retraction actuator 201 as a driver.

The light control mirror 82 is formed by filling a space between glasses, on which ITO films are formed, with an electrolyte containing silver, and the silver is deposited/eluted by turning voltage on/off, so that a state of the light control mirror 82 can be changed to a mirror state and to a half mirror state. Further, the light control mirror 82 has a piezo thin film (not illustrated) formed on its surface, and is configured to deform its shape into a state of a parabolic shape curved toward an object side and into a flat state, depending on the voltage applied to the piezo thin film.

The light control mirror controller 101 is configured to change the voltage applied to the light control mirror 82 based on a signal from a main body controller 30, so as to change the state of the light control mirror 82 to the mirror state and to the half mirror state, and so as to deform the shape of the light control mirror 82 into the state of the parabolic shape curved toward the object side and into the flat state.

The lenses L3 and L4 are disposed in a direction of the eyepiece window 83 from the light control mirror 82. A lens unit including the lenses L3 and L4 acts as an enlargement lens configured to enlarge an image transmitted from the object window 102 side.

The lens retraction actuator 201 includes a motor or the like, and is configured to drive the lenses L3 and L4 based on a signal from the main body controller 30. Specifically, the lens retraction actuator 201 moves the lenses L3 and L4 so that the lenses L3 and L4 are in a state of being disposed on an optical path from the eyepiece window 83 to the object window 102, which is a state illustrated in FIG. 8A, and in a state of being disposed on a position retracted from the optical path, which is a state illustrated in FIG. 8B.

When the hybrid display apparatus 8e is set so as to function as the electronic view finder, the light control mirror controller 101 controls the voltage applied to the light control mirror 82 so that the light control mirror 82 is in the mirror state and has the flat shape. The organic EL panel 81 displays image data stored in a memory medium 23 or image data continuously generated by an image sensor 21, which is a so-called live view image, based on a control by the main body controller 30. Since the light control mirror 82 is in the mirror state and has the flat shape, the image displayed on the organic EL panel 81 is reflected by the light control mirror 82 toward the eyepiece window 83. At this time, since the lenses L3 and L4 are disposed on the optical path from the eyepiece window 83 to the object window 102 and in the direction of the eyepiece window 83 from the light control mirror 82, the image displayed on the organic EL panel 81 reaches the eyepiece window 83 after passing through the lenses L3 and L4, which act as the enlargement lens. As a result, the displayed image viewed from the eyepiece window 83 is larger than the image displayed on the organic EL panel 81. That is, the visibility of the displayed image viewed from the eyepiece window 83 is improved.

When the hybrid display apparatus 8e is set so as to function as the optical sight, the light control mirror controller 101 controls the voltage applied to the light control mirror 82 so that the light control mirror 82 is in the half mirror state and has the parabolic shape curved toward the object side.

When the hybrid display apparatus 8e is set so as to function as the optical sight, the organic EL panel 81 displays an optical sight mark 103 at a position corresponding to an approximate center of an angle of view which is captured by the image sensor 21, and displays the other areas in black. Since the light control mirror 82 is in the half mirror state, the light control mirror 82 transmits light from the object window 102 and reflects the optical sight mark 103 toward the eyepiece window 83 so that the optical sight mark 103 is superimposed on the light from the object window 102. At this time, since the light control mirror 82 has the parabolic shape curved toward the object side, the reflected light becomes a parallel light ray, and the reflected image of the optical sight mark 103 appears at a fixed position in the eyepiece window 83 regardless of a position of a user's eye.

When the hybrid display apparatus 8e functions as the optical sight, if the lenses L3 and L4, which act as the enlargement lens, are disposed on the optical path from the eyepiece window 83 to the object window 102, the light from the object window 102 passes through the lenses L3 and L4, and the image from the object window 102 is enlarged. In this embodiment, the lens retraction actuator 201 moves the lenses L3 and L4 to the position retracted from the optical path from the eyepiece window 83 to the object window 102, so that the image from the object window 102 is not enlarged. That is, the image from the object window 102 can be viewed from the eyepiece window 83 at the same magnification. Here, the same magnification includes not only a case where the magnification is exactly the same, but also a case where the magnification is substantially the same.

As described above, according to the configuration of this embodiment, it is possible to realize the small-sized hybrid display apparatus 8e which can change its function to the optical sight and to the electronic view finder, and the image pickup apparatus 1e having the same.

Seventh Embodiment

Next, a description will be given of an image pickup apparatus 1f according to a seventh embodiment of the present disclosure. The image pickup apparatus 1f in this embodiment is different from the image pickup apparatus 1 in the first embodiment in that it has a hybrid display apparatus 8f instead of the hybrid display apparatus 8. The other configurations of the image pickup apparatus 1f in this embodiment are the same as those of the image pickup apparatus 1 in the first embodiment, and therefore a description thereof will be omitted.

Figure 9A:
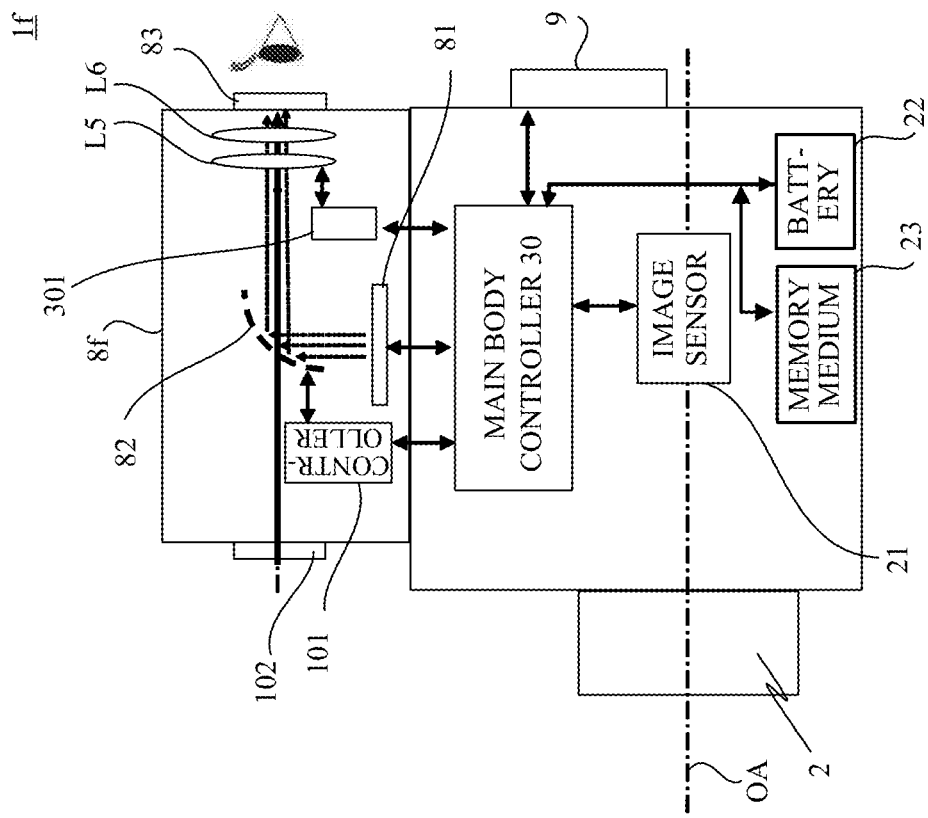
FIGS. 9A and 9B are block diagrams illustrating an image pickup apparatus according to a seventh embodiment.
Figure 9B:
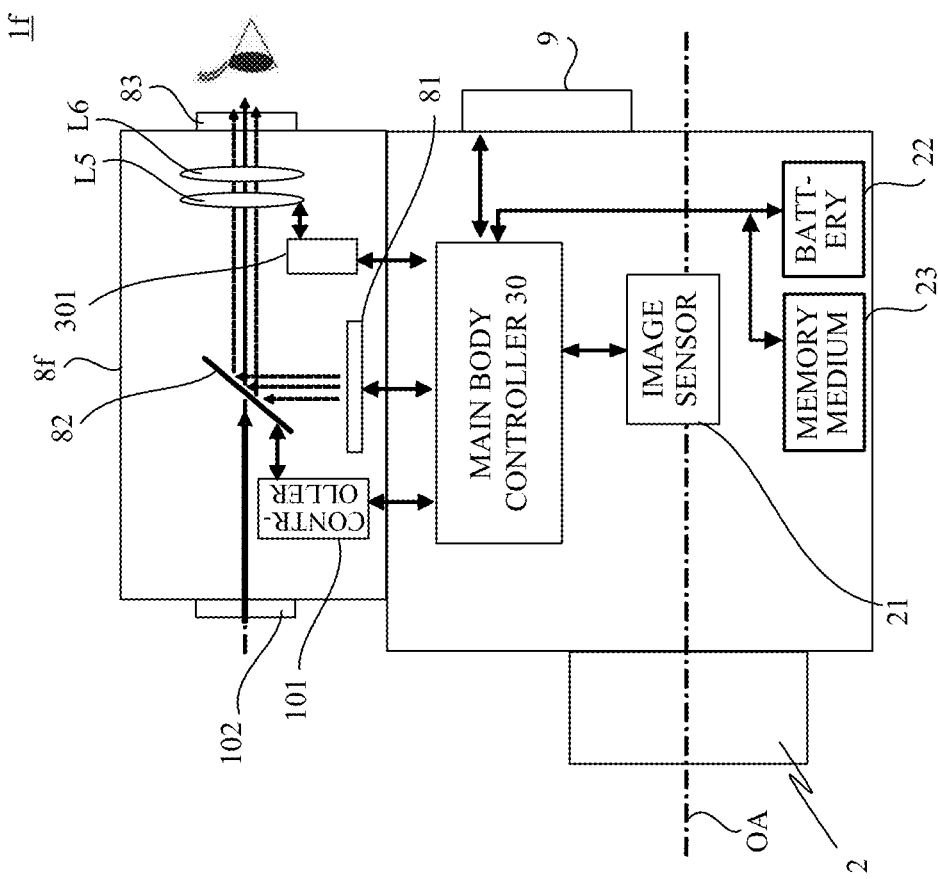

A detailed configuration of the hybrid display apparatus 8f will be described with reference to FIGS. 9A and 9B. FIGS. 9A and 9B are block diagrams illustrating the image pickup apparatus 1f. FIG. 9A illustrates a state in which the hybrid display apparatus 8f functions as an electronic view finder, and FIG. 9B illustrates a state in which the hybrid display apparatus 8f functions as an optical sight.

The hybrid display apparatus 8f includes an organic EL panel 81 as a display panel, a light control mirror 82 as a reflection optical element, an eyepiece window 83 as an eyepiece portion, a light control mirror controller 101, an object window 102, shape-variable lenses L5 and L6, and a shape-variable lens deformation unit 301.

The light control mirror 82 is formed by filling a space between glasses, on which ITO films are formed, with an electrolyte containing silver, and the silver is deposited/eluted by turning voltage on/off so that a state of the light control mirror 82 can be changed to a mirror state and to a half mirror state. Further, the light control mirror 82 has a piezo thin film (not illustrated) formed on its surface, and is configured to deform its shape into a state of a parabolic shape curved toward an object side and into a flat state, depending on the voltage applied to the piezo thin film.

The light control mirror controller 101 is configured to change the voltage applied to the light control mirror 82 based on a signal from a main body controller 30, so as to change the state of the light control mirror 82 to the mirror state and to the half mirror state, and so as to deform the shape of the light control mirror 82 into the state of the parabolic shape curved toward the object side and into the flat state.

The shape-variable lenses L5 and L6 are made of, for example, liquid lenses, and are disposed in a direction of the eyepiece window 83 from the light control mirror 82.

The shape-variable lens deformation unit 301 includes various actuators, and is configured to deform the shapes of the shape-variable lenses L5 and L6 based on a signal from the main body controller 30. Specifically, the shape-variable lens deformation unit 301 deforms the shapes of the shape-variable lenses L5 and L6 so that the shape-variable lenses L5 and L6 are in a state of acting as an enlargement lens configured to enlarge an image transmitted from the object window 102 side, which is a state illustrated in FIG. 9A, and in a state of not performing magnification variation of the transmitted image, which is a state illustrated in FIG. 9B.

When the hybrid display apparatus 8f is set so as to function as the electronic view finder, the light control mirror controller 101 controls the voltage applied to the light control mirror 82 so that the light control mirror 82 is in the mirror state and has the flat shape. The organic EL panel 81 displays image data stored in a memory medium 23, or image data continuously generated by an image sensor 21, which is a so-called live view image, based on a control by the main body controller 30. Since the light control mirror 82 is in the mirror state and has the flat shape, the image displayed on the organic EL panel 81 is reflected by the light control mirror 82 toward the eyepiece window 83. At this time, the shape-variable lenses L5 and L6 are in the state of acting as the enlargement lens, and the image displayed on the organic EL panel 81 reaches the eyepiece window 83 after passing through the shape-variable lenses L5 and L6 which act as the enlargement lens. As a result, the displayed image viewed from the eyepiece window 83 is larger than the image displayed on the organic EL panel 81. That is, the visibility of the displayed image viewed from the eyepiece window 83 is improved.

When the hybrid display apparatus 8f is set so as to function as the optical sight, the light control mirror controller 101 controls the voltage applied to the light control mirror 82 so that the light control mirror 82 is in the half mirror state and has the parabolic shape curved toward the object side.

When the hybrid display apparatus 8f is set so as to function as the optical sight, the organic EL panel 81 displays an optical sight mark 103 at a position corresponding to an approximate center of an angle of view which is captured by the image sensor 21, and displays the other areas in black. Since the light control mirror 82 is in the half mirror state, the light control mirror 82 transmits light from the object window 102 and reflects the optical sight mark 103 toward the eyepiece window 83 so that the optical sight mark 103 is superimposed on the light from the object window 102. At this time, since the light control mirror 82 has the parabolic shape curved toward the object side, the reflected light becomes a parallel light ray, and the reflected image of the optical sight mark 103 appears at a fixed position in the eyepiece window 83 regardless of a position of a user's eye.

When the hybrid display apparatus 8f functions as the optical sight, if the shape-variable lenses L5 and L6 act as the enlargement lens, the light from the object window 102 passes through the shape-variable lenses L5 and L6, and thus the image from the object window 102 is enlarged. In this embodiment, the shape-variable lens deformation unit 301 deforms the shapes of the shape-variable lenses L5 and L6 so that the shape-variable lenses are in the state of not performing magnification variation such as enlargement or reduction on the transmitted image, so that the image from the object window 102 is not enlarged. That is, the image from the object window 102 can be viewed from the eyepiece window 83 at the same magnification. Here, the same magnification includes not only a case where the magnification is exactly the same, but also a case where the magnification is substantially the same.

As described above, according to the configuration of this embodiment, it is possible to realize the small-sized hybrid display apparatus 8f which can change its function to the optical sight and to the electronic view finder, and the image pickup apparatus 1f having the same.

In each embodiment, the hybrid display apparatus is integrally configured with the image pickup apparatus, but the present disclosure is not limited to this. The hybrid display apparatus may be configured to be detachably attachable to the image pickup apparatus. In this case, each of the hybrid display apparatus and the image pickup apparatus may include a wired or wireless communication unit so that the controller 101 and the main body controller 30 can communicate with each other and so that the organic EL panel 81 and the main body controller 30 can communicate with each other.

In each embodiment, the operation button 9 is used as a change unit for changing the function of the hybrid display apparatus into the function as the electronic view finder and into the function as the optical sight, but the present disclosure is not limited to this. In each embodiment, an operation unit other than the operation button 9 may be used and, for example, the display apparatus 10 may be configured as a touch panel, and an operation on the touch panel may change the function of the hybrid display apparatus into the function as the electronic view finder and into the function as the optical sight. Further, in each embodiment, the organic EL panel 81 is used as the image display element, but the present disclosure is not limited to this, and another image display element such as a liquid crystal panel may be used.

According to each embodiment, it is possible to provide a small-sized display apparatus which can change its function to an optical sight and to an electronic view finder, and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-126653, filed on Jul. 27, 2020, Japanese Patent Application No. 2020-144157, filed on Aug. 28, 2020 and Japanese Patent Application No. 2021-083792, filed on May 18, 2021 which are hereby incorporated by reference herein in their entirety.

What is claimed is:

1. A display apparatus comprising:
an image display element;
an eyepiece portion;
an object window; and
a mirror disposed at a position between the eyepiece portion and the object window, the mirror being configured to guide a picture displayed on the image display element to the eyepiece portion,
wherein the mirror changes a state to a first state and to a second state by changing a transmittance,
wherein in the first state, the picture displayed on the image display element is viewed via the eyepiece portion,
wherein in the second state, an image in which an image from the object window and an image displayed on the image display element are superimposed is viewed via the eyepiece portion,
wherein in the first state, the mirror has a planar surface shape, and
wherein in the second state, the mirror has a curved surface shape.

2. The display apparatus according to claim 1, wherein in the second state, the image displayed on the image display element is a predetermined mark.

3. The display apparatus according to claim 2, wherein the predetermined mark appears at a fixed position in the eyepiece portion regardless of a position of a user's eye.

4. The display apparatus according to claim 1, wherein the mirror has a curved surface shape.

5. The display apparatus according to claim 1, wherein in the first state, the display apparatus is used as an electronic view finder, and
wherein in the second state, the display apparatus is used as an optical sight.

6. The display apparatus according to claim 5, wherein the eyepiece portion functions as both an eyepiece portion of the electronic view finder and an eyepiece portion of the optical sight.

7. The display apparatus according to claim 1, wherein the mirror a light control mirror.

8. The display apparatus according to claim 1, further comprising:
   an enlargement lens disposed at a position between the mirror and the eyepiece portion, the enlargement lens being configured to enlarge the picture; and
   a reduction lens disposed at a position between the object window and the mirror, the reduction lens being configured to reduce the image from the object window.

9. An image pickup apparatus comprising:
   an image pickup optical system; and
   a display apparatus according to claim 1.

10. The display apparatus according to claim 1, wherein in the first state, the display apparatus is used as an electronic view finder, and wherein in the second state, the display apparatus is used as an optical sight.

11. An image pickup apparatus comprising: an image pickup optical system; and a display apparatus according to claim 1.

12. A display apparatus comprising:
   an image display element;
   an eyepiece portion;
   an object window; and
   a mirror disposed at a position between the eyepiece portion and the object window, the mirror being configured to guide a picture displayed on the image display element to the eyepiece portion,
   wherein the mirror changes a state to a first state and to a second state by changing a transmittance,
   wherein in the first state, the picture displayed on the image display element is viewed via the eyepiece portion,
   wherein in the second state, an image in which an image from the object window and an image displayed on the image display element are superimposed is viewed via the eyepiece portion,
   wherein the mirror includes a first mirror having a planar surface shape, and a second mirror having a curved surface shape,
   wherein in the first state, the first mirror is in a total reflection state, and the second mirror is in a total transmission state, and
   wherein in the second state, the first mirror is in a total transmission state, and the second mirror is in a half transmission state.

13. The display apparatus according to claim 12,
   wherein in the first state, the display apparatus is used as an electronic view finder, and
   wherein in the second state, the display apparatus is used as an optical sight.

14. An image pickup apparatus comprising:
   an image pickup optical system; and
   a display apparatus according to claim 12.

15. A display apparatus comprising:
   an image display element;
   an eyepiece portion;
   an object window;
   a mirror disposed at a position between the eyepiece portion and the object window, the mirror being configured to guide a picture displayed on the image display element to the eyepiece portion; and
   a position detector configured to detect a position of a user's eye ball relative to the eyepiece portion by detecting a reflection of light projected on the user's eye ball,
   wherein the mirror changes a state to a first state and to a second state by changing a transmittance,
   wherein in the first state, the picture displayed on the image display element is viewed via the eyepiece portion,
   wherein in the second state, an image in which an image from the object window and an image displayed on the image display element are superimposed is viewed via the eyepiece portion,
   wherein the mirror has a planar surface shape, and
   wherein in the second state, the mirror moves a position of the image displayed on the image display element, based on the position of the eye ball detected by the position detector.

16. The display apparatus according to claim 15,
   wherein in the first state, the display apparatus is used as an electronic view finder, and
   wherein in the second state, the display apparatus is used as an optical sight.

17. An image pickup apparatus comprising:
   an image pickup optical system; and
   a display apparatus according to claim 15.

18. A display apparatus comprising:
   an image display element;
   an eyepiece portion;
   an objeet window;
   a mirror disposed at a position between the eyepiece portion and the object window, the mirror being configured to guide a picture displayed on the image display element to the eyepiece portion;
   an enlargement lens disposed at a position between the mirror and the eyepiece portion, the enlargement lens being configured to enlarge the picture; and
   a reduction lens disposed at a position between the object window and the mirror, the reduction lens being configured to reduce the image from the object window,
   wherein the mirror changes a state to a first state and to a second state by changing a transmittance,
   wherein in the first state, the picture displayed on the image display element is viewed via the eyepiece portion,
   wherein in the second state, an image in which an image from the object window and an image displayed on the image display element are superimposed is viewed via the eyepiece portion, and
   wherein a reciprocal of an enlargement magnification of the enlargement lens is the same as a reduction magnification of the reduction lens.

19. The display apparatus according to claim 18,
   wherein in the first state, the display apparatus is used as an electronic view finder, and
   wherein in the second state, the display apparatus is used as an optical sight.

20. An image pickup apparatus comprising:
   an image pickup optical system; and
   a display apparatus according to claim 18.

21. A display apparatus comprising:
   an image display element;
   an eyepiece portion;
   an object window; and
   a mirror disposed at a position between the eyepiece portion and the object window, the mirror being configured to guide a picture displayed on the image display element to the eyepiece portion,
   wherein the mirror changes a state to a first state and to a second state by changing a transmittance,
   wherein in the first state, the picture displayed on the image display element is viewed via the eyepiece portion, wherein in the second state, an image in which an image from the object window and an image displayed on the image display element are superimposed is viewed via the eyepiece portion, and wherein the display apparatus further comprises:
an enlargement lens configured to enlarge the picture; and
an actuator configured to drive the enlargement lens so that (a) in the first state, the enlargement lens is disposed at a position between the mirror and the eyepiece portion, and (b) in the second state, the enlargement lens retracts from the position between the mirror and the eyepiece portion.

22. The display apparatus according to claim 21,
wherein in the first state, the display apparatus is used as an electronic view finder, and
wherein in the second state, the display apparatus is used as an optical sight.

23. An image pickup apparatus comprising:
an image pickup optical system; and
a display apparatus according to claim 21.

24. A display apparatus comprising:
an image display element;
an eyepiece portion;
an object window; and
a mirror disposed at a position between the eyepiece portion and the object window, the mirror being configured to guide a picture displayed on the image display element to the eyepiece portion, wherein the mirror changes a state to a first state and to a second state by changing a transmittance, wherein in the first state, the picture displayed on the image display element is viewed via the eyepiece portion, wherein in the second state, an image in which an image from the object window and an image displayed on the image display element are superimposed is viewed via the eyepiece portion, and wherein the display apparatus further comprises:
a shape-variable lens disposed at a position between the mirror and the eyepiece portion, the shape-variable lens having a variable shape; and
a deformation unit including various actuators, configured to deform a shape of the shape-variable lens so that (a) in the first state, the picture is enlarged, and (b) in the second state, magnification variation on the image from the object window is not performed.

25. The display apparatus according to claim 24,
wherein in the first state, the display apparatus is used as an electronic view finder, and
wherein in the second state, the display apparatus is used as an optical sight.

26. An image pickup apparatus comprising:
an image pickup optical system; and
a display apparatus according to claim 24.

* * * * *